United States Patent [19]

Thornton

[11] Patent Number: 4,629,474

[45] Date of Patent: Dec. 16, 1986

[54] THERMALLY FORMED FILTER

[75] Inventor: Donald I. Thornton, Warwick, R.I.

[73] Assignee: Allied Corporation, Morristown, N.J.

[21] Appl. No.: 772,987

[22] Filed: Sep. 6, 1985

[51] Int. Cl.$^4$ ............................................. B01D 39/04
[52] U.S. Cl. .................................. 264/109; 210/491;
210/508; 264/DIG. 48
[58] Field of Search .............. 264/DIG. 48; 210/496,
210/497.01, 508, 315, 342, 452, 448, 489, 490,
491, 492; 55/DIG. 5

[56] References Cited

U.S. PATENT DOCUMENTS

| 2,963,744 | 12/1960 | Cooper | 210/508 |
| 3,003,643 | 10/1961 | Thomas | 210/491 |
| 3,073,735 | 1/1963 | Till et al. | 156/38 |
| 3,251,475 | 5/1966 | Till et al. | 210/508 |
| 3,261,473 | 7/1966 | Riede | 210/282 |
| 3,347,391 | 10/1967 | Steensen | 210/491 |

FOREIGN PATENT DOCUMENTS

| 2608618 | 9/1977 | Fed. Rep. of Germany | 210/338 |
| 2295783 | 12/1974 | France | 210/338 |
| 738952 | 10/1955 | United Kingdom | 210/496 |

Primary Examiner—Frank Sever
Attorney, Agent, or Firm—K. C. Decker; W. N. Antonis

[57] ABSTRACT

A fluid filter and method for its manufacture in which an air laid batt is formed consisting of a randomly arrayed mixture of thermoplastic fibers and fibers which are not thermoplastic. The batt is cut into sections and is formed into cup-shaped articles in a heated mold. Accordingly, depending upon the degree of heat and pressure applied, the articles can be made of varying densities, to thereby provide articles of larger or smaller permeability and stiffness. The articles are then nested together to form a fluid filter in which fluid flows through the article of lowest density to remove the larger particles entrained in the fluid first, and then flows through articles of progressively higher density to remove progressively smaller particles. At least some of the particles have been heated and/or compressed sufficiently to be structurally self-supporting, thereby providing a filter article which does not need metallic centertube supports, etc., for structural rigidity.

5 Claims, 5 Drawing Figures

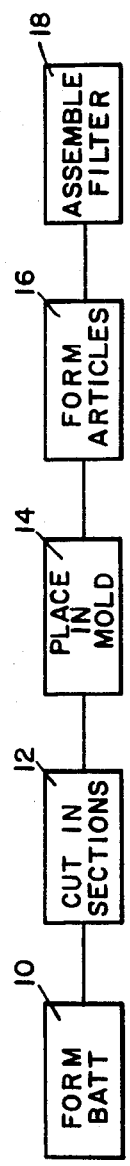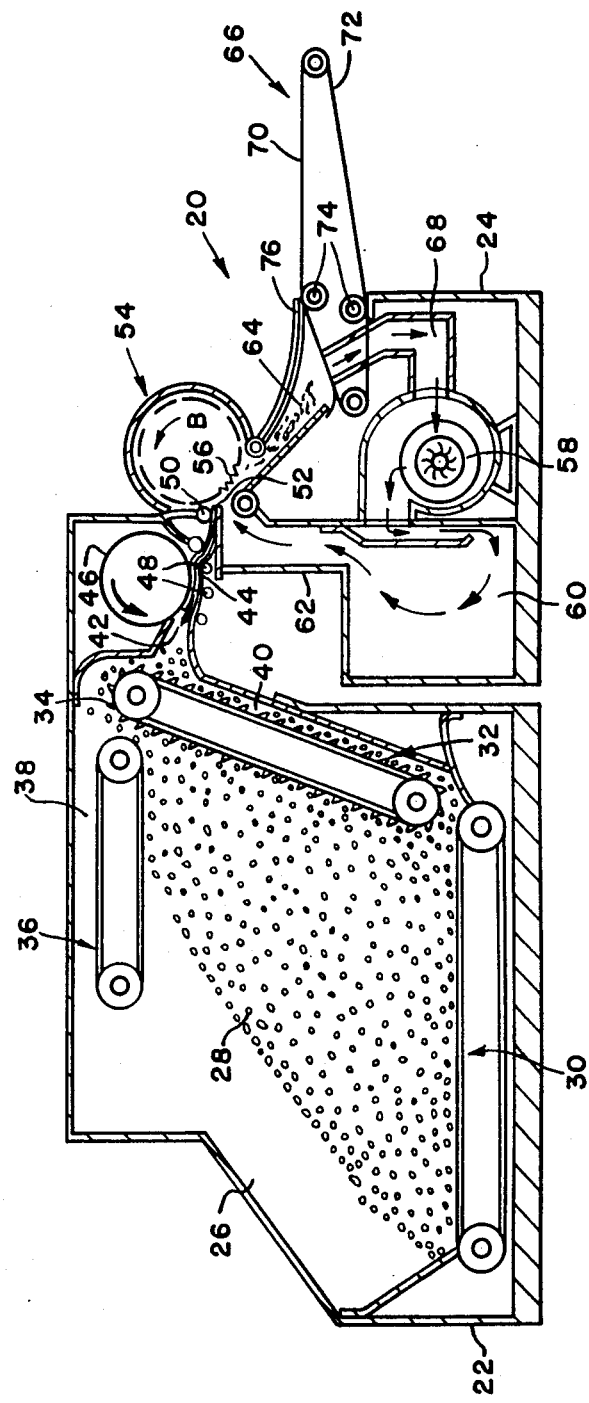

THERMALLY FORMED FILTER

This invention relates to a thermally formed fluid filter and a method for manufacturing such a fluid filter.

Typical prior art fluid filters, such as those used to filter engine lubricating oil or engine inlet air, usually consists of an assembly of a pleated paper filtering media supported by a centertube and closed at the ends of the media by end caps bonded to the ends of the pleated paper media. In many cases the pleats are further closed and sealed by a metal clip or adhesive. The present invention eliminates many of these components necessary in prior art filters and uses the filtering media itself not only for filtration, but also for support and sealing. Accordingly, the fluid filter proposed herein is potentially much cheaper than existing prior art filters, not only because many of the components and their inherent expehse are eliminated, but also because the manufacture of the filter is simplified, thereby eliminating a significant proportion of the labor cost.

The present invention uses a filtering media comprising fibers which are both thermoplastic and fibers which are not thermoplastic (or a batt made from fibers which are not thermoplastic which is impregnated with a thermoset binder) and which can be cut to shape and molded into various structures having varying degrees of stiffness and permeability depending on the mold configuration, and the heat and pressure applied to the media. In general, the higher the heat and the greater the pressure the lower the permeability and the greater the stiffness of the molded media.

The other advantages of the invention will become apparent from the following description with reference to the accompanying drawings, in which:

FIG. 1 is a block diagram illustrative of the process of making the filter pursuant to our present invention;

FIG. 2 is a cross sectional illustration of the machine used to produce the air laid batt used in our invention;

Figure 5:
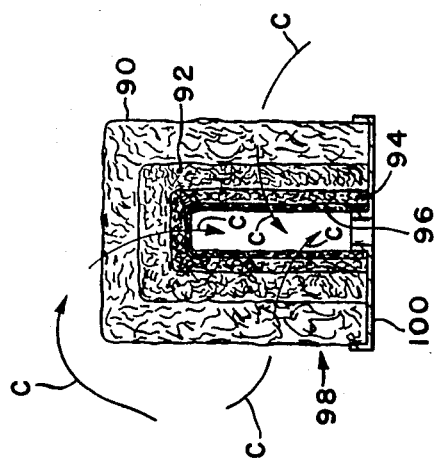
FIG. 5 is a cross sectional view of the filter media according to our present invention.

Referring now to the drawings, and more particularly the block diagram of FIG. 1, block 10 indicates that the batt is first formed as herein described with reference in FIG. 2. In block 12, the batt produced is cut into the appropriate sections. In block 14, the sections of the batt are placed in the mold illustrated in FIG. 3. In block 16, molded articles are formed in the mold illustrated in FIG. 3 by applying heat and pressure to the batt sections. Preferably, a series of such articles are formed which are generally cup-shaped and which have different diameters, as will be discussed hereinbelow, which are later nested together in order to form a gradient density filter. As indicated in block 18, the final step in the process is to assemble the articles formed in the mold into a completed filter.

As illustrated in FIG. 2, an air laid nonwoven batt formation machine generally indicated by the numeral 20, of the type available commercially from the Rando Machine Corporation and generally illustrated in U.S. Pat. No. 3,918,126, includes two relatively large housings 22, 24. The housing 22 includes a relatively larger hopper 26 which receives a fiber mixture generally indicated by the numeral 28. The fiber mixture 28 includes both thermoplastic fibers, such as vinyl fibers for fibers made from a thermal setting resin, and fibers which are not thermoplastic, such as, for example, wood pulp fibers or textile fibers. Although a wide range of the relative quantities of the different types of fibers is possible, it has been found that a mixture of about 30% thermoplastic fibers and the rest non-thermoplastic fibers achieves satisfactory results. A conveying apron 30 is operated by an appropriate power source (not shown) to move the fibers 28 to the right, viewing FIG. 2, toward an elevating apron generally indicated by the numeral 32. The elevating apron 32 is provided with spikes 34 so that the apron 32 conveys the fibers upwardly, viewing FIG. 1. A stripper apron generally indicated by the numeral 36 is mounted in the upper part of the hopper 26, viewing FIG. 2. A blower (not shown) provides metered air flow through the channel 38 defined between the upper race of the apron 36 and the corresponding portion of the housing 22. The metered air flow through the channel 38 removes fibers at a predetermined rate from the elevating apron 32. The remaining fibers are returned to the hopper 26 through the channel 40. The metered air flow passing through the channel 38 forces the other fibers into a duct 42. The air flow through the duct 42 enters a porous condensor screen 46 which is rotated in the direction indicated by the arrow A. The feed mat 44 is formed between the screen 46 and mechanical rolls 48. The feed mat 44 is transferred by the mechanical rolls 48 to a feed roll 50 and is then passed over a conventional serrated nose bar 52. The fibers are brushed off the nose bar 52 by a conventional lickerin generally indicated by the numeral 54. The lickerin 54 is provided with a serrated surface defining spikes or teeth 56 across the entire width and around the circumference of the lickerin 54. The lickerin 54 is powered for rotation as indicated by the arrow B in FIG. 2.

The fibers are doffed from the lickerin 54 by the centrifugal forces generated by the rotating speed of the lickerin 54 and also by air flow provided by a blower 58. The blower 58 blows air into a chamber 60 defined within the housing 24. The air flow from the blower 58 is guided through a duct 62, around a portion of the surface of the lickerin 54, and into a duct 64. The fibers are removed from the lickerin and are conveyed by the air stream from blower 58 through the duct 64 to a foraminous conveyor generally indicated by the numeral 66. The inlet of the blower 58 is connected to a duct 68 which communicates with the duct 64 through a foraminous belt 70 comprising a part of the conveyor 66. Since the belt 70 is porous and permits air flow therethough, the blower 58 is capable of circulating air through the ducts 62, 64 and 68. The foraminous belt 70 is mounted on guide rollers 72 which are driven by an appropriate motor (not shown). The nonwoven web or mat is formed on the foraminous belt 70 which includes a portion 74 extending from the dust cover 76 to permit ready removal of the batt as it is formed. Accordingly, the completed batt can be removed from the foraminous belt 70.

After the completed batt is removed from the foraminous belt 70, it is cut into sections of an appropriate size by any appropriate mechanism well known to those skilled in the art. Each of the batt sections 78 are placed over the top of an open cavity mold generally indicated by the numeral 80. The batt section 78 is forced into the mold 80 by plunger 82. The sidewalls 84, 86 of the open cavity mold 80 are designed with sufficient clearance with the sides of the plunger 82 to exert a predetermined pressure on the batt section 78 as it is forced into the open cavity mold 80. Appropriate electrical resistance heaters, indicated diagrammatically as at 88, heat the open cavity mold 80 and the plunger 82 to a temperature that can be controlled by the operator. Accordingly, the temperature at which the batt section 78 is heated can be varied over a relatively wide range. Although only a single mold 80 and plunger 82 are illustrated, it should be understood that a series of such molds and plungers will be necessary, because, pursuant to the invention, articles made from batt sections 78 of different diameters will be required.

Figure 4:
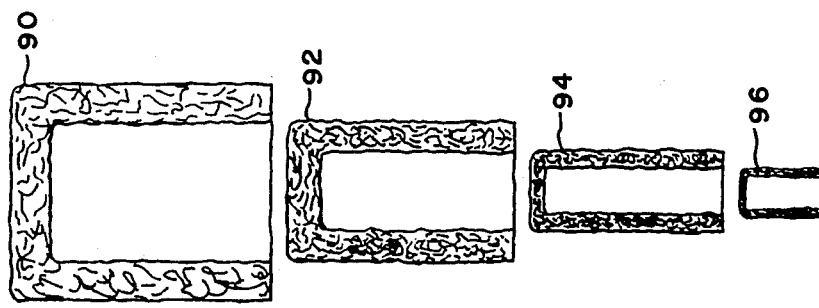
FIG. 4 is an exploded view illustrating the articles produced by the mold illustrated in FIG. 3.
Figure 3:
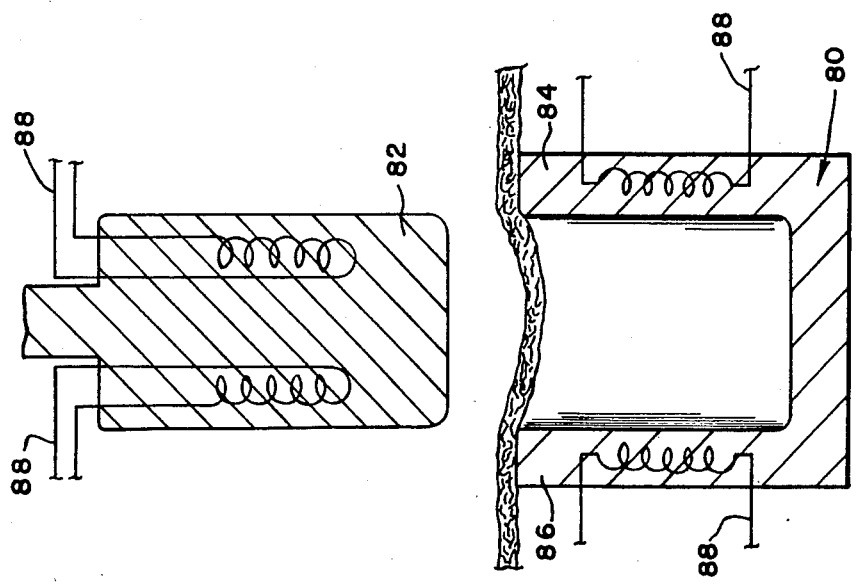
FIG. 3 is a diagrammatic illustration of the mold used to form the batt produced by the machine of FIG. 2 into the filter article.

Referring now to FIG. 4, formed articles 90, 92, 94 and 96 are illustrated which were formed in a corresponding set of molds similar to the mold illustrated in FIG. 3. The article 90 was formed from a batt section 78 which was treated in a mold at a relatively low temperature so that the density of the article 90 is less than the density of the articles 92, 94 and 96. Accordingly, the article 90 will have a relatively high permeability and, while it is sufficiently stiff to retain its shape, it is not as stiff as the other articles 92, 94 or 96. Article 92 is heated to a higher temperature, than is the article 90, so that the article 92 is stiffer and has a lower permeability than does the article 90, but has a higher permeability and is less stiff than the articles 94 and 96. The article 96 is the stiffest article and is structurally self-supporting. The article 96 may be sufficiently stiff that it assists in the support of the other articles 90, 92, 94 when it is assembled with them as illustrated in FIG. 5. The permeability of the article 96 will be relatively low, so that very small particles may be trapped thereby. However, the article 96 does have sufficient permeability to permit the fluid to be filtered to flow therethrough. Of course, the temperature and pressure at which the articles 90-96 are treated are functions of the type of thermoplastic fibers used therein and the size of the particles which each of the articles designed to remove from the fluid being filtered, as well as several other parameters.

Referring to FIG. 5, the articles 90-96 have been assembled by nesting them together with the article 90 receiving the article 92, the article 92 receiving the article 94, and the article 96 being received by the article 94. Accordingly, a filter element generally indicated by the numeral 98 has been formed after the metallic end cap 100 has been assembled thereto. Of course, the element 98 would normally be housed in a metallic container, such as that shown in U.S. Pat. No. 4,144,168, with the necessary inlets and outlets, and the necessary anti-drainback and relief valves, etc. In conventional pleated paper filters of the same capacity, a metallic centertube is necessary to support the filter. However, at least the article 96 has sufficient structural stiffness to provide the necessary support, while also acting as a filtering media. Some of the necessary supports, springs, etc., used in prior art filters are also eliminated in the filter element illustrated in FIG. 5. Fluid is communicated through the filter element 98 in the direction as indicated by the arrows "C". Accordingly, the fluid first flows through the least dense article 90, which removes the larger particles, while the smaller particles remain entrained in the fluid. The fluid then flows through successively more dense articles 92, 94, 96 in which successively smaller particles are removed. This is very desirable from a filtration standpoint, since it is desirable that the larger particles be eliminated by the less dense media so that the larger particles do not clog the pores of the media which removes the smaller particles.

By way of illustration, but not by way of limiting the invention, there may be given the following example:

Using the apparatus of FIG. 2, an air laid batt is manufactured consisting of about 30 percent of fibers made from a vinyl polymer, known commercially as vinyon, and with the remainder wood pulp fibers. The batt is cut into sections, and the sections are placed in a series of molds similar to those illustrated in FIG. 3 but of different sizes in order to produce the articles 90, 92, 94, and 96 as illustrated in FIG. 4, and with different clearances between the plungers and their corresponding mold cavities so that the mold sets with the larger clearances produce the less dense articles and the molds sets with the smaller clearances produce the more dense articles. The molds are heated to predetermined temperatures, and are closed for predetermined times. The articles are then removed from the molds and assembled. Of course, as explained above, the density of the articles can also be varied by changing the time, temperature, and pressure under which the articles are formed.

I claim:

1. Method of forming a fluid filter comprising the steps of forming a nonwoven batt comprising a randomly arrayed mixture of the thermoplastic fibers and fibers which are not thermoplastic, dividing the batt into at least two sections, molding said batt sections into the desired shape of a fluid filter, and heating said batt sections during molding at a predetermined temperature while applying a predetermined pressure to said batt sufficient to soften said thermoplastic fibers and partially fuse said fibers into a filter structure having sufficient stiffness to be structurally self-supporting while retaining sufficient permeability to permit the fluid to be filtered to pass therethrough, each of said batt sections being molded at different temperatures and/or pressures to form an article of greater density and lower permeability and an article of lesser density and greater permeability, and assembling said articles to form a filter having a density and permeability gradient.

2. Method of forming a fluid filter as claimed in claim 1, wherein said batt is molded into a cup-shaped filter.

3. Method of forming a filter as claimed in claim 1, including the step of molding said sections into cup-shaped articles having different diameters, and the smaller cup-shaped articles are nested into successively larger article.

4. Method of forming a filter as claimed in claim 3, including the step of nesting said cup-shaped articles so that fluid flowing through the filter first passes through the article having the lesser density and successively passes through the articles having greater density.

5. Method of forming a filter as claimed in claim 1, including the step of assembling said sections so that fluid flowing through the filter first passes through the section of lesser density and then passes through the section of greater density.

* * * * *